US006587335B1

(12) United States Patent
Nelson et al.

(10) Patent No.: US 6,587,335 B1
(45) Date of Patent: Jul. 1, 2003

(54) CONVERGING COOLING DUCT FOR A COMPUTER COOLING SYSTEM

(75) Inventors: Daryl J. Nelson, Beaverton, OR (US); Steve J. Lofland, Portland, OR (US); Eric J. Salskov, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 36 days.

(21) Appl. No.: 09/608,916

(22) Filed: Jun. 30, 2000

(51) Int. Cl.[7] ................................................. G06F 1/20
(52) U.S. Cl. ...................... 361/687; 361/695; 165/80.3; 415/213.1; 415/214.1
(58) Field of Search ................................. 361/687, 688, 361/695, 697, 699; 165/121–126, 80.3; 415/177, 178, 213.1, 214.1

(56) References Cited

U.S. PATENT DOCUMENTS

| | | | | | |
|---|---|---|---|---|---|
| 5,202,816 A | * | 4/1993 | DeWilde | ................... | 165/80.3 |
| 5,535,094 A | * | 7/1996 | Nelson et al. | ............... | 361/697 |
| 5,559,673 A | * | 9/1996 | Gagnon et al. | ............. | 361/695 |
| 5,566,377 A | * | 10/1996 | Lee | .............................. | 361/695 |
| 5,917,698 A | * | 6/1999 | Viallet | .......................... | 361/695 |
| 6,021,042 A | * | 2/2000 | Anderson et al. | ........... | 361/695 |
| 6,064,571 A | * | 5/2000 | Noble | ......................... | 361/695 |
| 6,113,485 A | * | 9/2000 | Marquis t al. | ............. | 165/80.3 |
| 6,148,907 A | * | 11/2000 | Cheng | ......................... | 165/121 |
| 6,215,659 B1 | * | 4/2001 | Chen | .......................... | 361/695 |
| 6,253,834 B1 | * | 7/2001 | Sterner | ....................... | 165/80.3 |

* cited by examiner

*Primary Examiner*—Darren Schuberg
*Assistant Examiner*—Lisa Lea-Edmonds
(74) *Attorney, Agent, or Firm*—Blakely, Sokoloff, Taylor & Zafman LLP

(57) ABSTRACT

A method and apparatus for cooling components within a computer system chassis. In one embodiment, a cooling duct unit includes an air moving unit base with an air moving unit to draw and accelerate air from outside a computer system chassis to a high velocity airflow. Connected to the air moving unit base is a duct to converge and change the high velocity airflow from a circular shape to a noncircular shape. The converged and changed high velocity airflow is directed to cool a device within a computer system chassis. As a result, the device within the computer system is chassis cooled more uniformly and efficiently, while reducing acoustic noise and providing a modular cooling duct unit design for ease of attachment and removal.

18 Claims, 7 Drawing Sheets

CONVERGING COOLING DUCT FOR A COMPUTER COOLING SYSTEM

FIELD OF INVENTION

The present invention relates to the field of cooling systems in computer systems. More specifically, the present invention relates to cooling ducts that direct air drawn from outside the computer system to electronic components in the computer system.

BACKGROUND OF THE INVENTION

The current generation of central processing units (CPUs) and its components, collectively known as Processor Core Logic (PCL) components, generate a significant amount of heat during operation. If the heat generated by the PCL components is not properly dissipated, then the heat builds up and raises the temperature of the PCL components beyond their recommended operating temperatures. This adversely affects the performance of the PCL components. Various devices have been implemented to keep PCL components at their recommended operating temperatures by transferring or dissipating heat generated by the PCL components away from the PCL components.

One known approach is to purge heated air from within the computer system chassis with an axial fan mounted to the rear of the computer system chassis in the vicinity of the PCL component area. Commonly, the purging rear fan operated in series with a power supply fan both acting as an air exchanger. In order to further facilitate heat dissipation, an active fan heat sink is attached to the processor. The active fan heat sink is commonly in the form of an axial fan attached to the processor generating airflow onto the processor, thereby force-cooling the processor. Force-cooling involves cooling a specific component by directly applying air onto and across the surface of the component. High velocity air applied to the surface of the component raises the convective heat transfer coefficient of the surface of that component, thereby increasing convection cooling with respect to that component. Air exchange cooling involves replacing heated air in a first location, such as inside a chassis of the computer system, with cooler air from a second location, such as outside the chassis.

As the number of fans increases to reduce the heat generated from the PCL components, the cost and acoustic noise of the computer system increases. Additionally, as the number of fans increases, the energy efficiency decreases due to the power required to run the fans.

BRIEF DESCRIPTION OF DRAWINGS

The present invention is illustrated by way of example and not by way of imitation in the figures of the accompanying drawings, in which the like references indicate similar elements and in which.

DETAILED DESCRIPTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without specific details. In other instances, well-known features are omitted or simplified in order not to obscure the present invention.

Figure 1A:
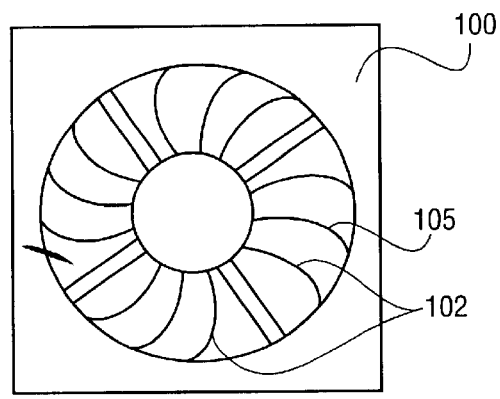
FIGS. 1a & 1b illustrate an air moving unit and prior art method of cooling a device within a computer system chassis.
Figure 1B:
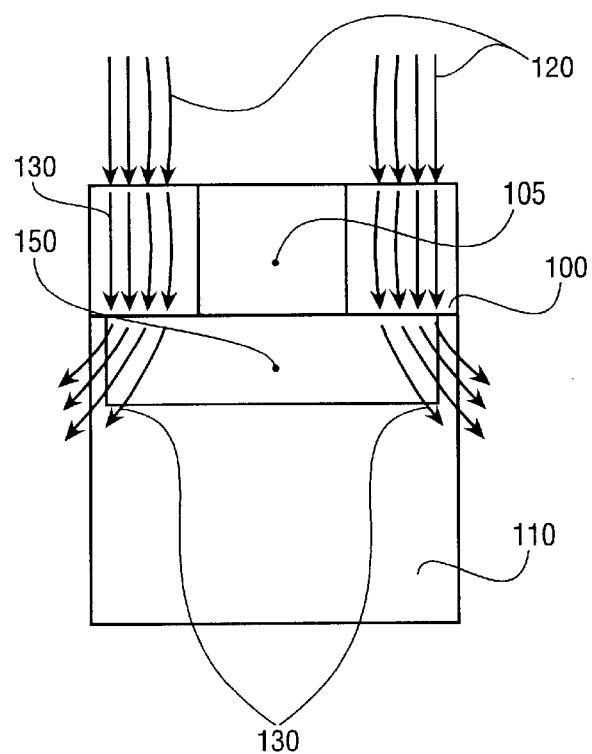

FIGS. 1a & 1b illustrate an air moving unit and prior art method of cooling a device within a computer system chassis. Shown in FIG. 1a, is an air moving unit in the form of a square axial fan 100. The square axial fan 100 may be a standard square axial fan with fan blades 102 attached to and rotating about a hub 105. The square axial fan 100 may be of any type of square axial fan known in the art such as, but not limited to, a 3.15 inch (80 mm) square axial fan.

Shown in the prior art of FIG. 1b, the square axial fan is incorporated with a heat sink 110 of devices (not shown) within a computer system chassis (not shown) to cool the devices. In FIG. 1b, the square axial fan 100 draws air 120 from above, accelerates the air to a high velocity airflow 140, and directs the high velocity airflow 140 onto the heat sink 110 to cool the heat sink 110, and in turn, cool the devices (not shown) coupled to the heat sink 110. Due to the nature of the axial fan 100, the high velocity airflow 140 is circular in shape. Shown in FIG. 1b, is a hub effect 150, where an area opposite the hub 105 experiences low velocity airflow as compared to the areas opposite the blades 102, due to the circular shape of the high velocity airflow. The high velocity airflow will depend upon the type of square axial fan employed, and may be, but not limited to, a high velocity airflow of 800 ft/min (4.1 m/sec), but the shape of the high velocity airflow will be circular in shape due to the shape of the axial fan. Because of the hub effect 150, the cooling of the heat sink 110 is inefficient and non-uniform. The cooling of the heat sink 110 is less in the area opposite the hub 105 than the areas of the heat sink 110 opposite the high velocity airflow 130.

Figure 2:
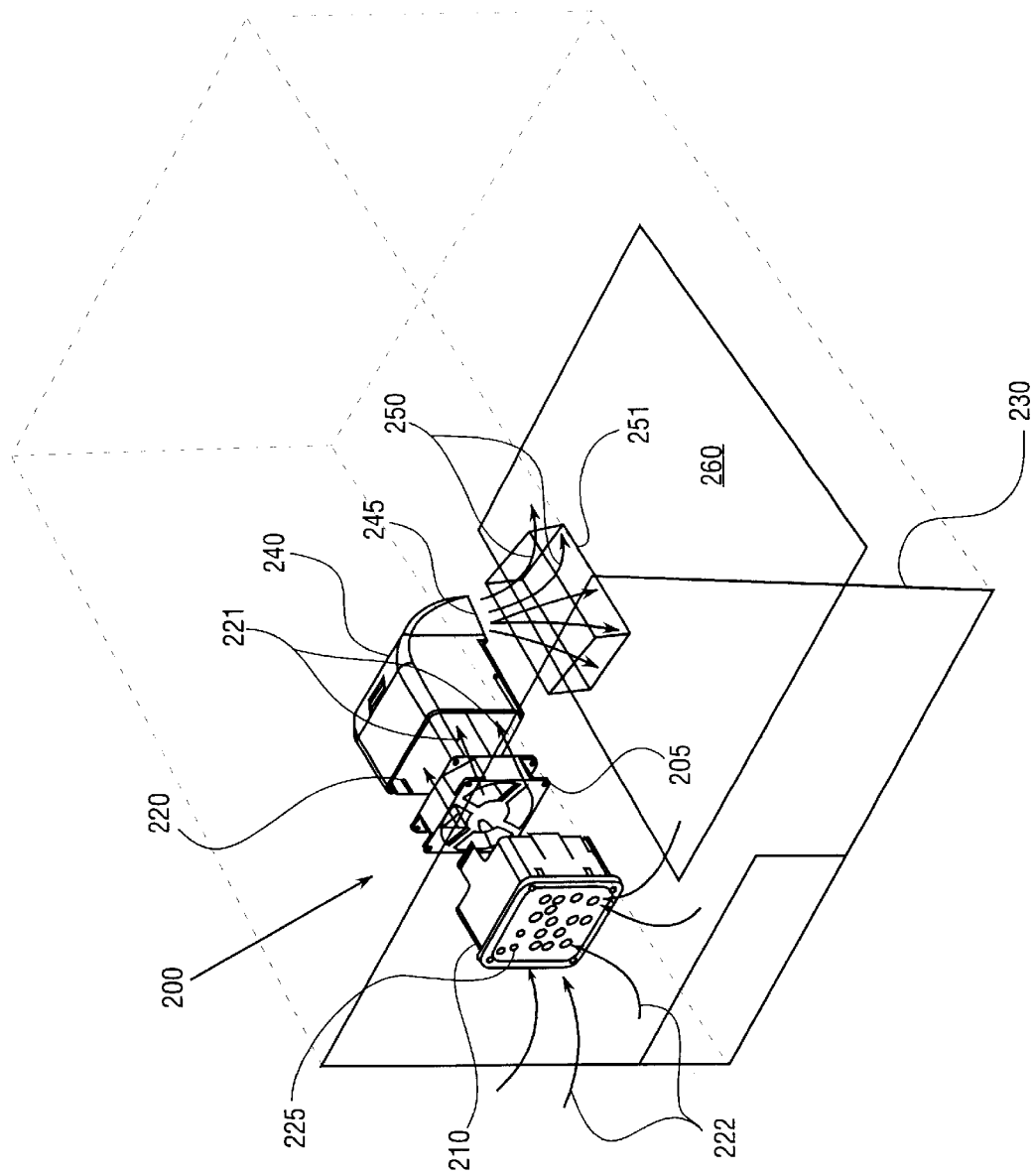
FIG. 2 illustrates an exploded perspective view of a cooling duct unit according to an embodiment of the present invention.

FIG. 2 illustrates an exploded perspective view of a cooling duct unit according to an embodiment of the present invention. The cooling duct unit 200 includes an air moving unit base 210. A duct 240 having an inlet 220 is coupled to the air moving unit base 210 to receive a high velocity airflow 221 from an air moving unit 205. Shown in FIG. 2, the air moving unit draws and accelerates air 222 from outside a computer system chassis 230 to the high velocity airflow 221. Connected to the air moving unit base 210 is an air inlet 225 to receive the air 222 from outside the computer system chassis 230. The duct 240 having also an outlet 245 converges and changes the high velocity airflow 221 from a circular shape to a noncircular shape, and directs the converged and changed high velocity air flow 250 to cool a device 251 which may be integrated with a motherboard 260 within the computer system chassis 230. It will be appreciated by one skilled in the art that the computer system chassis may be of any type of computer system chassis known in the art, where efficient and uniform cooling of devices is required within a limited amount of space.

The device 251 may be processor core logic (PCL) components with or without the heat sink 110 as shown in FIG. 1. The air moving unit 205 may be the square axial fan 100 (shown in FIG. 1).

The cooling duct unit 200 shown in FIG. 2 substantially eliminates the hub effect 150 (shown in FIG. 1), thereby more efficiently and uniformly cooling the device 251 within the computer system chassis 230.

Figure 3:
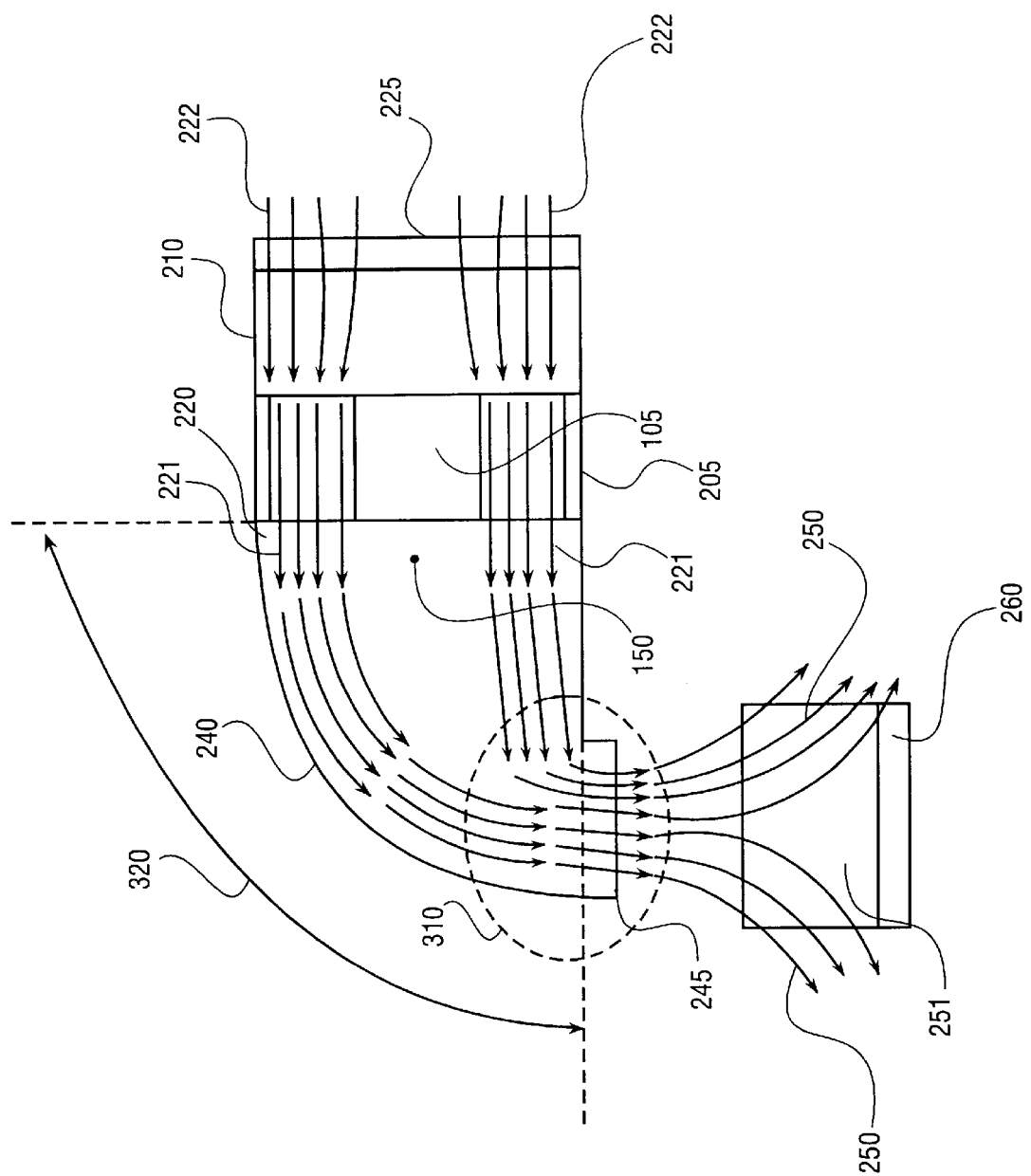
FIG. 3 illustrates airflow within the cooling duct unit according to one embodiment of the present invention.

FIG. 3 illustrates airflow within the cooling duct unit according to one embodiment of the present invention. In FIG. 3, the air moving unit 205 draws and accelerates air 222 from outside the computer system chassis 230 (shown in FIG. 2) through the air inlet 225 to the high velocity airflow 221. Shown in FIG. 3, the high velocity airflow 221 is received at the inlet 220 of the duct 240. The hub effect 150 in the area opposite the hub 105 is also present in the cooling duct unit due to the circular shape of the high velocity airflow 221. However, in FIG. 3, the high velocity airflow 221 is converged in a converging area 310. In the illustrated embodiment, the high velocity airflow is converged due the duct 240 having an angle 320 and a shape that is substantially rectangular at the outlet 245. In one embodiment, the angle 320 of the duct 240 is 90 degrees from a plane of the inlet 220 relative to the outlet 245. Alternate embodiments could have different angles and outlet shapes.

Shown in FIG. 3, drawing and accelerating air 222 from outside the computer system chassis 230 to the high velocity airflow 221 and converging and changing the high velocity air flow 221 from a circular shape to a noncircular shape through the duct 240 with the angle 320 substantially eliminates the hub effect 150. Thus, when the converged and changed high velocity airflow 250 is directed to the device 251 on the motherboard 260 within the computer system chassis 230 (shown in FIG. 2), more uniform and efficient cooling of the device within the computer system chassis is achieved.

Figure 4A:
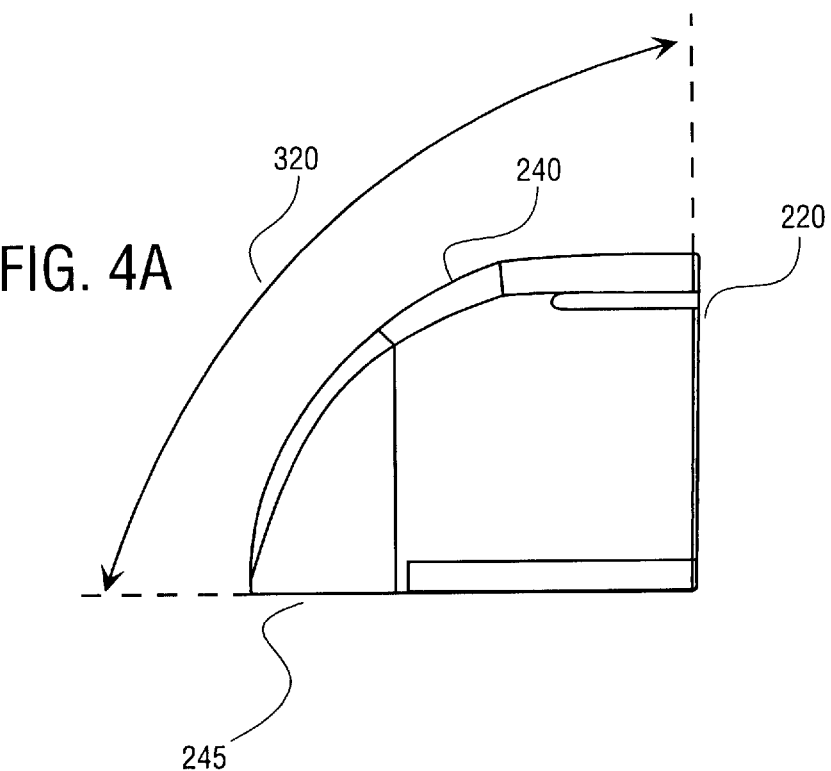
FIGS. 4a–4c illustrate different views of the duct of the cooling duct unit in accordance with one embodiment of the present invention.
Figure 4B:
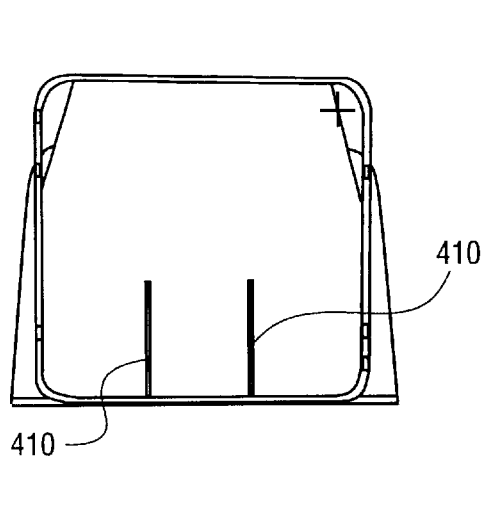
Figure 4C:
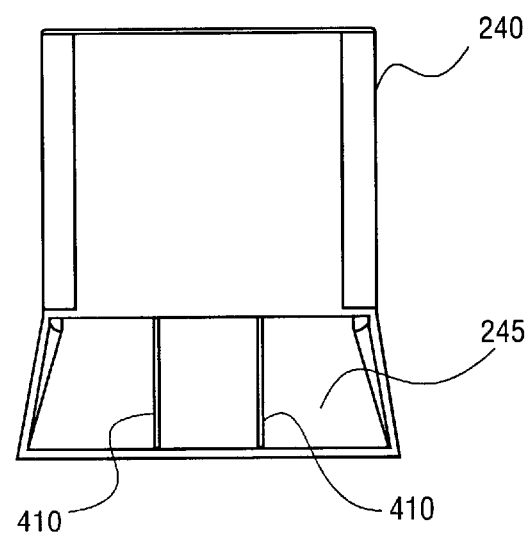

FIGS. 4a–4c illustrate different views of the duct of the cooling duct unit in accordance with one embodiment of the present invention. Shown in the side view of the duct 240 of FIG. 4a, the duct 240 has the inlet 220, the outlet 245, and the angle 320. FIG. 4c illustrates a bottom view of the duct 240 showing the substantially rectangular shaped outlet 245. In one embodiment, a ratio of length to width of the substantially rectangular shaped outlet 245 may be two to one respectively. The dimensions of the outlet may be of any dimensions to allow sufficient volume of high velocity airflow to cool devices within a computer system chassis such as, but not limited to, a range of 25 cubic feet per minute (CFM) (708 Liter per minute) to 30 CFM (850 Liter per minute).

In the one embodiment shown in FIGS. 4a–4c, in order to reduce the acoustic noise associated with the operation of the cooling duct unit 200, ribs 410 that structurally stiffen the cooling duct unit are oriented substantially parallel to the high velocity airflow direction. FIG. 4b illustrates a view looking into the inlet 220 showing the ribs 410 within the duct 240, and the ribs 410 are also shown in FIG. 4c at the outlet 245 of the duct 240.

The acoustic noise associated with the operation of the cooling duct unit 200 relates to the vibrational frequency of the cooling duct unit 200, in particular, a frequency known as a "first natural frequency". During operation, in order to maintain low levels of acoustic noise, the "first natural frequency" may be twice the blade frequency of the axial fan. The blade frequency of the axial fan defined by the following equation:

Blade Frequency=(rotations per minute)*(number of blades)/60.

The blade frequency having the units of cycles per second (Hz).

Additionally, in one embodiment, in order to increase drawn air while reducing air velocity and pressure drop through the air inlet 225, the position of the air moving unit 205 may be 1.0 inch (25.4 mm) from the air inlet 225. As a result, acoustic noise, such as "broadband" noise, may also be reduced.

Thus, the cooling duct unit 200 achieves more uniform and efficient cooling of the devices within the computer system chassis, while reducing acoustic noise.

FIGS. 5a–5e illustrate different views of the air moving unit base with attaching flanges to removably attach the air moving unit and the duct in accordance with one embodiment of the present invention. Shown in FIGS. 5a–5e is the air moving unit base 210 with a first and second substantially opposed attaching flanges 510 and 520.

The first substantially opposed attaching flanges 510 are used to removably attach the air moving unit 205 to the air moving unit base 210. As shown in FIGS. 5a–5e, the first substantially opposed attaching flanges 510 allow for removing and attaching the air moving unit 205 with little effort, thereby allowing the cooling duct unit 200 to be modular, i.e., the air moving unit may be removed or attached without the use of tools.

The second substantially opposed attaching flanges 520 are used to removably attach the duct 240 to the air moving unit base 210. As shown in FIGS. 5a–5e, the substantially opposed attaching flanges 520 allow for removing and attaching the duct 240 in different orientations with little effort, thereby further allowing the cooling duct unit 200 to be modular, i.e., the duct 240 may be removed or attached in a different orientation to the air moving unit base 210 without the use of tools.

It should be appreciated by one skilled in the art that the first and second substantially opposed attaching flanges may be of any type that allow the removal and attachment without the use of tools such as, but not limited to, substantially opposed attaching flanges that use tension for attachment.

Figure 5A:
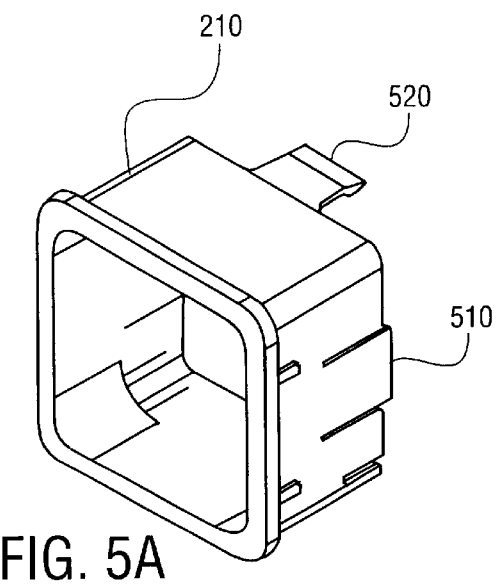
FIGS. 5a–5e illustrate different views of the air moving unit base with attaching flanges to removably attach the air moving unit and the duct in accordance with one embodiment of the present invention.
Figure 5C:
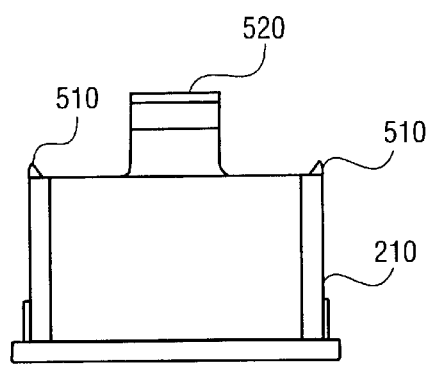
Figure 5B:
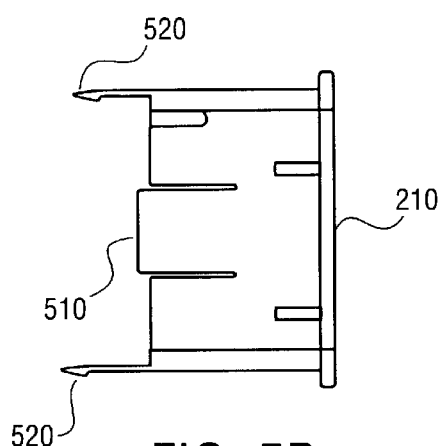
Figure 5D:
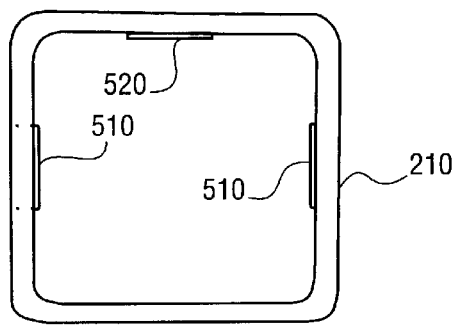
Figure 5E:
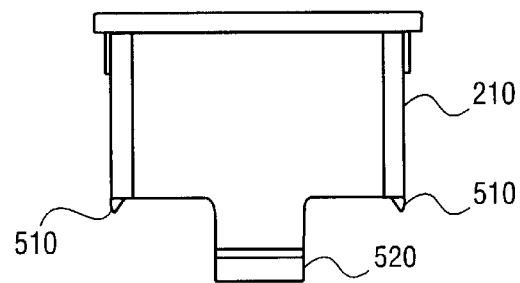

FIG. 5b, illustrates a side view of the air moving unit base 210 with the first and second substantially opposed attaching flanges 510 and 520. FIG. 5c, illustrates a top view of the air moving unit base 210 with the first and second substantially opposed attaching flanges 510 and 520. FIG. 5b, illustrates a view of the side of the air moving unit base 210, which attaches to the air inlet 225 (shown in FIG. 2) with the first and second substantially opposed attaching flanges 510 and 520. FIG. 5b, illustrates a bottom view of the air moving unit base 210 with the first and second substantially opposed attaching flanges 510 and 520.

Thus, the illustrated embodiment of the cooling duct unit 200 achieves more uniform and efficient cooling of the devices within the computer system chassis, while reducing acoustic noise and being modular for ease of attachment and removal without the use of tools.

Figure 6:
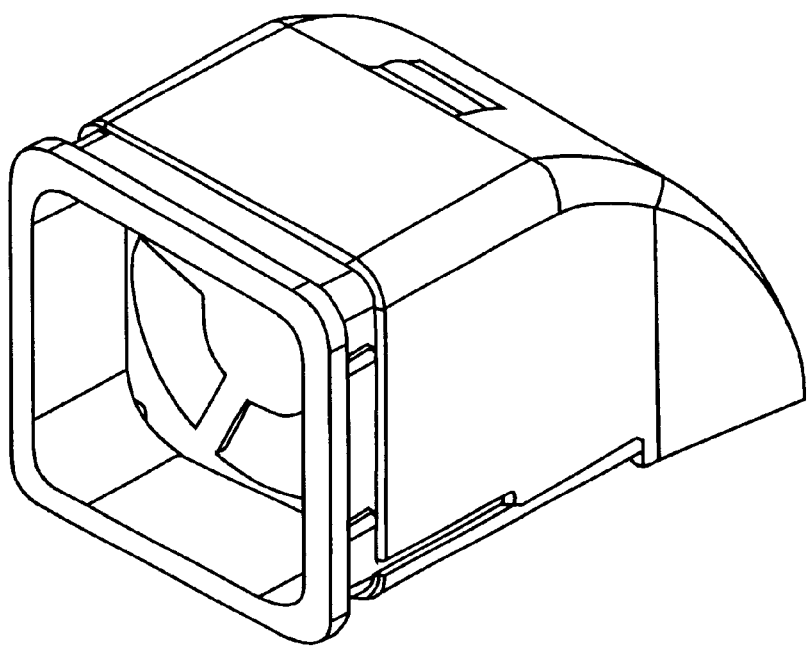
FIG. 6 illustrates a perspective view of one embodiment of a fully assembled cooling duct unit.

FIG. 6 illustrates a perspective view of one embodiment of a fully assembled cooling duct unit. The fully assembled cooling duct unit 600 shown in FIG. 6 draws and accelerates air from outside a computer system chassis to a high velocity airflow. The fully assembled cooling duct unit 600 converges and changing the high velocity air flow from a circular shape to a noncircular shape substantially eliminating the hub effect. Thus, more uniform and efficient cooling of a device within a computer system chassis is achieved, while reducing acoustic noise. Additionally, the cooling duct unit 600 is modular allowing for ease of attachment and removal of the cooling duct unit components.

Figure 7:
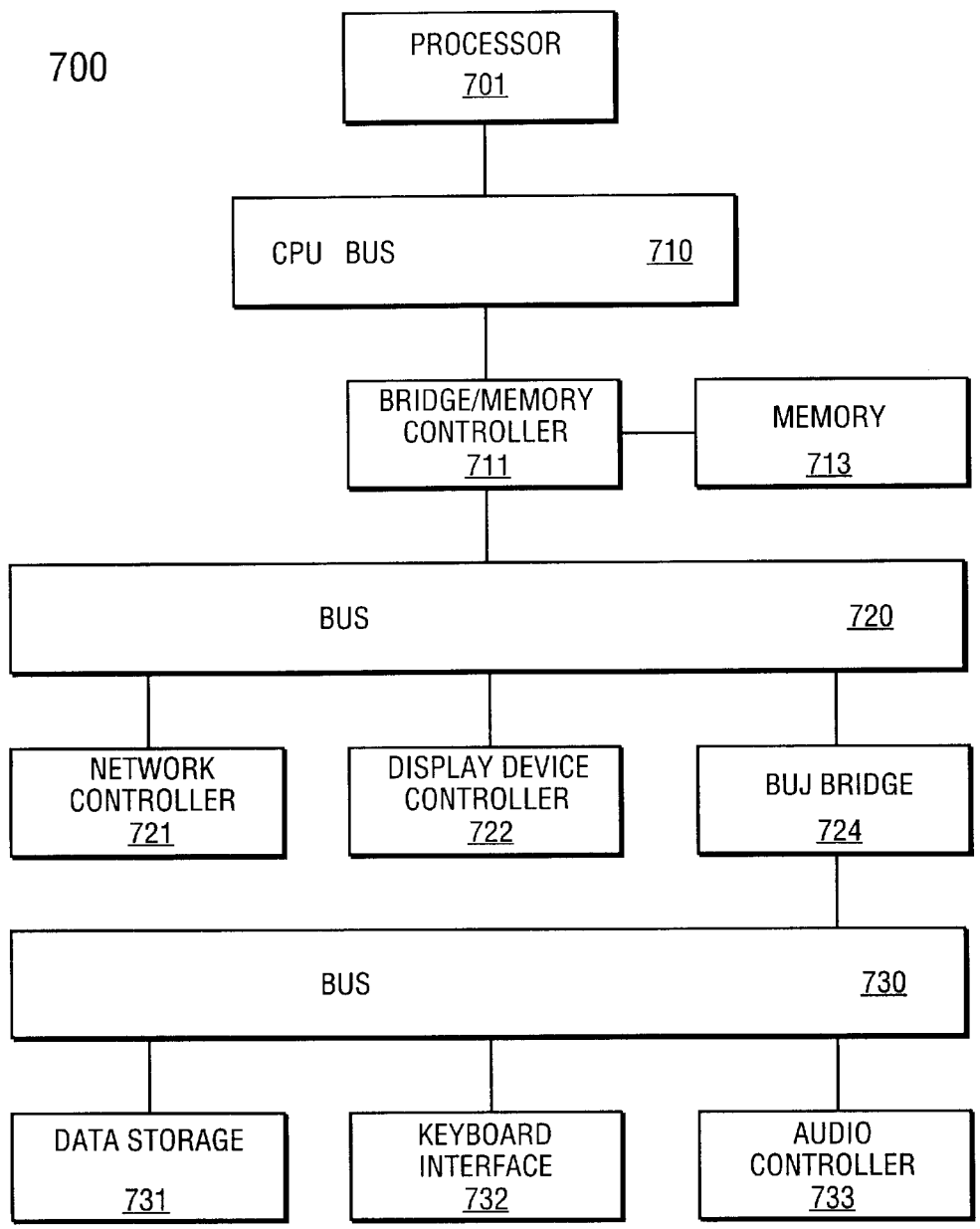
FIG. 7 illustrates a computer system upon which an embodiment of the present invention can be implemented.

FIG. 7 illustrates a computer system 700 upon which an embodiment of the present invention can be implemented. The computer system 600 includes a processor 701 that processes data signals. The processor 701 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 7 shows an example of the present invention implemented on a single processor computer system 700. However, it is understood that the present invention may be implemented in a computer system having multiple processors. The processor 701 is coupled to a CPU bus 710 that transmits data signals between processor 701 and other components in the computer system 700.

The computer system 700 includes a memory 713. The memory 713 may be a dynamic random access memory (DRAM) device, a synchronous direct random access memory (SDRAM) device, or other memory device. The memory 713 may store instructions and code represented by data signals that may be executed by the processor 701.

A bridge/memory controller 711 is coupled to the CPU bus 710 and the memory 713. The bridge/memory controller 711 directs data signals between the processor 701, the memory 713, and other components in the computer system 700 and bridges the data signals between the CPU bus 710, the memory 713, and a first I/O bus 720.

The first I/O bus 720 may be a single bus or a combination of multiple buses. As an example, the first I/O bus 720 may comprise a Peripheral Component Interconnect (PCI) bus, a Personal Computer Memory Card International Association (PCMCIA) bus, a NuBus, or other buses. The first I/O bus 720 provides communication links between components in the computer system 700. A network controller 721 is coupled to the first I/O bus 720. The network controller 721 links the computer system 700 to a network of computers (not shown in FIG. 7) and supports communication among the machines. A display device controller 722 is coupled to the first I/O bus 720. The display device controller 722 allows coupling of a display device (not shown) to the computer system 700 and acts as an interface between the display device and the computer system 700. The display device controller 722 may be a monochrome display adapter (MDA) card, a color graphics adapter (CGA) card, an enhanced graphics adapter (EGA) card, an extended graphics array (XGA) card or other display device controller. The display device (not shown) may be a television set, a computer monitor, a flat panel display or other display device. The display device receives data signals from the processor 701 through the display device controller 722 and displays the information and data signals to the user of the computer system 700.

A second I/O bus 730 may be a single bus or a combination of multiple buses. As an example, the second I/O bus 730 may comprise a PCI bus, a PCMCIA bus, a NuBus, an Industry Standard Architecture (ISA) bus, or other buses. The second I/O bus 730 provides communication links between components in the computer system 700. A data storage device 731 is coupled to the second I/O bus 730. The data storage device 731 may be a hard disk drive, a floppy disk drive, a CD-ROM device, a flash memory device or other mass storage device. A keyboard interface 732 is coupled to the second I/O bus 730. The keyboard interface 732 may be a keyboard controller or other keyboard interface. The keyboard interface 732 may be a dedicated device or can reside in another device such as a bus controller or other controller. The keyboard interface 732 allows coupling of a keyboard (not shown) to the computer system 700 and transmits data signals from a keyboard to the computer system 700. An audio controller 733 is coupled to the second I/O bus 730. The audio controller 733 operates to coordinate the recording and playing of sounds.

A bus bridge 724 couples the first I/O bus 720 to the second I/O bus 730. The bus bridge 724 operates to buffer and bridge data signals between the first I/O bus 720 and the second I/O bus 730.

In one embodiment, the cooling duct unit, as described above, is implemented on one or more computers such as the computer system of FIG. 6 to cool devices such as processor core logic (PCL) components. The PCL components may include the processor 701, the memory 713, a chipset (not shown), of which, the bridge/memory controller 711 may be a part, and graphics components such as the display device controller 722.

Thus, a method and apparatus for more uniform and efficient cooling of a device within a computer system chassis, while reducing acoustic noise within the computer system chassis, and is modular for ease of attachment and removal of the components of apparatus is described.

In the foregoing specification, the invention has been described with reference to specific embodiments thereof. It will however, be evident that various modifications and changes may be made thereto without departing from the broader spirit and scope of the invention. The specification and drawings are, accordingly, to be regarded in an illustrative rather than a restrictive sense.

What is claimed is:

1. An apparatus comprising:

an air moving unit base to couple to an air moving unit, said air moving unit to draw and accelerate air from outside a computer system chassis to a high velocity airflow; and a duct, coupled to the air moving unit base, the duct having an angled section to converge and change the high velocity airflow from a circular shape to a non-circular shape, the duct further including a substantially rectangle outlet.

2. The apparatus of claim 1, wherein said apparatus further comprises an air inlet, connected to the air moving unit base, to receive the air from outside the computer system chassis.

3. The apparatus of claim 1, wherein said air moving unit base comprises a first substantially opposed attaching flanges to removably attach the air moving unit to the air moving unit base.

4. The apparatus of claim 3, wherein said air moving unit base comprises a second substantially opposed attaching flanges to removably attach the duct to the air moving unit base.

5. The apparatus of claim 1, wherein said air moving unit base comprises a fan base.

6. The apparatus of claim 1, wherein said air moving unit comprises a square axial fan.

7. The apparatus of claim 1, wherein said device comprises processor core logic (PCL) components.

8. A method comprising:
  drawing and accelerating air from outside a computer system chassis by an air moving unit to a high velocity airflow through an air moving unit base; and
  converging and changing, via a duct having an angled section and a substantially rectangle outlet, the high velocity airflow from a circular shape to a noncircular shape through a duct; and
  directing the converged and changed high velocity airflow to cool a device within a computer system chassis.

9. The method of claim 8, wherein said method further comprises coupling the air moving unit base at an air inlet to receive air from outside the computer system chassis.

10. The method of claim 8, wherein said method comprises removably attaching the air moving unit to the air moving unit base with a first substantially opposed attaching flanges.

11. The method of claim 10, wherein said method comprises removably attaching the duct to the air moving unit base with a second substantially opposed attaching flanges.

12. The method of claim 8, wherein said drawing and accelerating the air from outside comprises drawing and accelerating the air from outside the computer system chassis by a square axial fan through a fan base.

13. A computer system comprising:
  a chassis;
  a processor core logic (PCL) components; and
  a cooling duct unit to fit within the chassis thermally connected to the PCL components to cool the PCL components, wherein said cooling duct unit comprises:
    an air moving unit base;
    an air moving unit, coupled to the air moving unit base, to draw and accelerate air from outside a computer system chassis to a high velocity airflow; and
  a duct, coupled to the air moving unit base, the duct having an angled section to converge and change the high velocity airflow from a circular shape to a non-circular shape, the duct further including a substantially rectangle outlet.

14. The computer system of claim 13, wherein said apparatus further comprises an air inlet, connected to the air moving unit base, to receive the air from outside the computer system chassis.

15. The computer system of claim 13, wherein said air moving unit base comprises a first substantially opposed attaching flanges to removably attach the air moving unit to the air moving unit base.

16. The computer system of claim 15, wherein said air moving unit base comprises a second substantially opposed attaching flanges to removably attach the duct to the air moving unit base.

17. The computer system of claim 13, wherein said air moving unit base comprises a fan base.

18. The computer system of claim 13, wherein said air moving unit comprises a square axial fan.

* * * * *

UNITED STATES PATENT AND TRADEMARK OFFICE
CERTIFICATE OF CORRECTION

PATENT NO.   : 6,587,335 B1
DATED        : July 1, 2003
INVENTOR(S)  : Nelson et al.

It is certified that error appears in the above-identified patent and that said Letters Patent is hereby corrected as shown below:

Column 1,
Line 53, delete "imitation" and insert -- limitation --.

Signed and Sealed this

Sixth Day of July, 2004

JON W. DUDAS
*Acting Director of the United States Patent and Trademark Office*